United States Patent
Delimont

(10) Patent No.: US 11,655,980 B2
(45) Date of Patent: May 23, 2023

(54) PILOTED ROTATING DETONATION ENGINE

(71) Applicant: Southwest Research Institute, San Antonio, TX (US)

(72) Inventor: Jacob Delimont, San Antonio, TX (US)

(73) Assignee: SOUTHWEST RESEARCH INSTITUTE, San Antonio, TX (US)

(*) Notice: Subject to any disclaimer, the term of this patent is extended or adjusted under 35 U.S.C. 154(b) by 0 days.

(21) Appl. No.: 17/247,920

(22) Filed: Dec. 30, 2020

(65) Prior Publication Data
US 2022/0205638 A1 Jun. 30, 2022

(51) Int. Cl.
*F23R 7/00* (2006.01)
*F02C 3/14* (2006.01)
*F02C 5/02* (2006.01)

(52) U.S. Cl.
CPC .......... *F23R 7/00* (2013.01); *F02C 3/14* (2013.01); *F02C 5/02* (2013.01); *F05D 2220/32* (2013.01)

(58) Field of Classification Search
CPC .............. F02K 7/02; F02K 7/04; F02K 7/067; F02C 5/00; F02C 5/10; F02C 5/11; F02C 5/02; F23R 7/00
See application file for complete search history.

(56) References Cited

U.S. PATENT DOCUMENTS

| | | | |
|---|---|---|---|
| 6,460,342 B1 | 10/2002 | Nalim | |
| 6,845,620 B2 | 1/2005 | Nalim | |
| 10,436,110 B2 | 10/2019 | Holley et al. | |
| 10,495,001 B2 | 12/2019 | Zelina et al. | |
| 2013/0056034 A1 | 3/2013 | Zhang et al. | |
| 2015/0167544 A1* | 6/2015 | Joshi | F02B 53/04 123/205 |
| 2017/0146244 A1* | 5/2017 | Kurosaka | F23R 3/10 |
| 2018/0180289 A1 | 6/2018 | Lavertu, Jr. et al. | |
| 2018/0355793 A1 | 12/2018 | Vise et al. | |
| 2018/0355822 A1 | 12/2018 | Vise et al. | |
| 2018/0356093 A1 | 12/2018 | Pal et al. | |
| 2018/0356094 A1 | 12/2018 | Zelina et al. | |
| 2019/0017437 A1 | 1/2019 | Tangirala et al. | |
| 2019/0120492 A1 | 4/2019 | Tangirala et al. | |
| 2019/0271268 A1 | 9/2019 | Johnson et al. | |

(Continued)

FOREIGN PATENT DOCUMENTS

| | | |
|---|---|---|
| CN | 102989721 A | 3/2013 |
| CN | 104153884 A | 11/2014 |
| CN | 104612821 A | 5/2015 |

OTHER PUBLICATIONS

Walters et al. Jul. 9-11, 2018, AIAA Propulsion and Energy Forum, 2018 Joint Propulsion Conference (Year: 2018).*

(Continued)

*Primary Examiner* — Gerald L Sung
(74) *Attorney, Agent, or Firm* — Grossman, Tucker, Perreault & Pfleger, PLLC

(57) ABSTRACT

A rotating detonation engine including an annular main chamber configured to sustain a main shockwave that moves along a perimeter of the main chamber and an annular pilot chamber configured to sustain a pilot shockwave that moves along a perimeter of the pilot chamber. The main shockwave may be generated in response to the pilot shockwave extending into the main chamber.

24 Claims, 6 Drawing Sheets

(56) References Cited

U.S. PATENT DOCUMENTS

2019/0360695 A1 11/2019 Johnson et al.
2020/0063968 A1 2/2020 Gutmark et al.

OTHER PUBLICATIONS

Schwinn et al. "Self Excited, Mult-kHz Dynamics in a Linear, Semi-Bounded Detonation Channel" AIAA SciTech Forum, 55th AIAA Aerospace Sciences Meeting (Year: 2017).*
B. Gelfand: et al. State-of-the-Art Report on Flame Acceleration and Deflagration-to-Detonation Transition in Nuclear Safety, OCDE Nuclear Safety NEA/CSNI/R(2000)7, Aug. 2000, 455 pages.
J. Kindracki: et al., Experimental research on the rotating detonation in gaseous fuels-oxygen mixtures, Shock Waves, vol. 21, 2011, pp. 75-84.
Frank K. Lu: et al., Rotating Detonation Wave Propulsion: Experimental Challenges, Modeling, and Engine Concepts (Invited), 47th AIAA/ASME/SAE/ASEE Joint Propulsion Conference & Exhibit, Jul. 31-Aug. 3, 2011, 20 pages.
R. Zhou; et al., Numerical investigation of shock wave reflections near the head ends of rotating detonation engines, Shock Waves, vol. 23, No. 5, 2013, pp. 461-472.

* cited by examiner

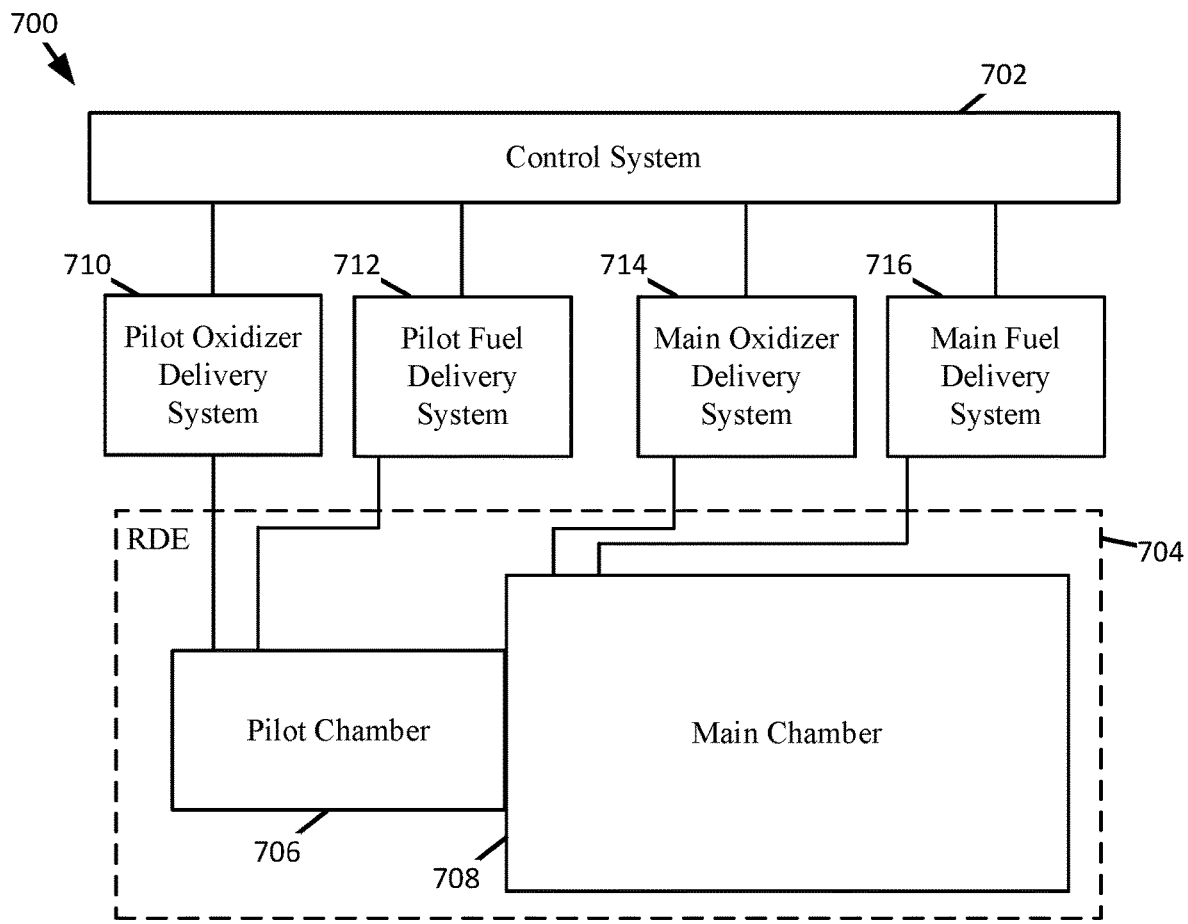
FIG. 7
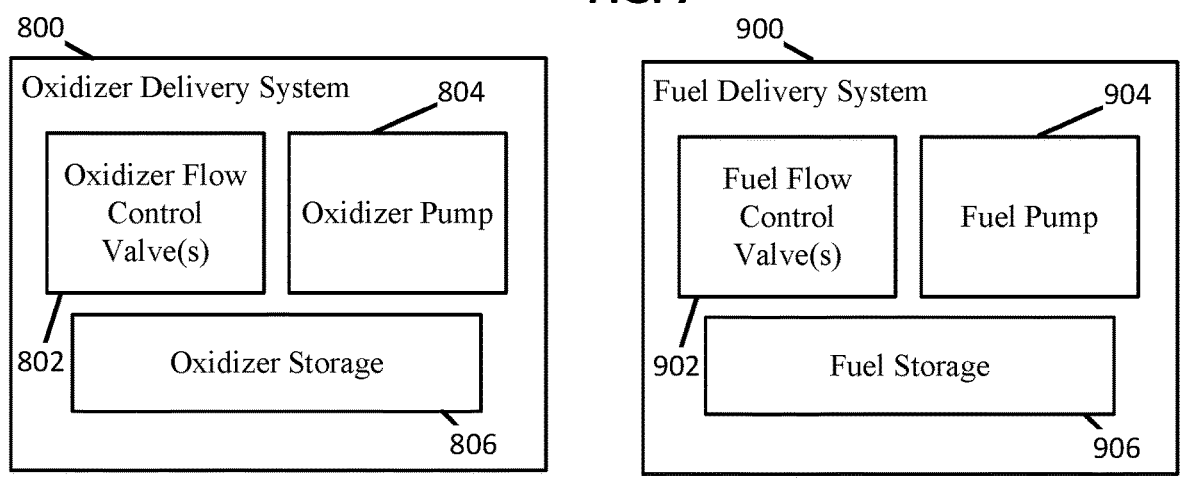
FIG. 8  FIG. 9

PILOTED ROTATING DETONATION ENGINE

TECHNICAL FIELD

The present invention is generally directed to rotating detonation engines and more particularly to a rotating detonation engine having piloted detonation.

BACKGROUND INFORMATION

Detonation combustion is a form of combustion that is capable of providing performance benefits in devices that use combustion as a process for heat addition. The detonation process includes generating a shockwave, or pressure wave, that is sustained by a chemical combustion process. The shockwave causes an increase in pressure concurrently with the consumption of fuel. The pressure increase improves the amount useful energy that is extracted from the fuel.

A rotating detonation engine ("RDE") utilizes shockwaves that move (or travel) circumferentially around an annular channel. The shockwave is capable of continuous propagation around the annular channel with continued provision of fuel. As shown in FIG. 1, as the size of the annular channel increases (e.g., a gap size), the stability of the generated shockwave decreases (e.g., as a result of increasing complexity of the generated shockwave). See, *Numerical Investigation Of Shock Wave Reflections Near The Head Ends Of Rotating Detonation Engines,* Shock Waves, vol. 23, no. 5, pp. 461-472 (2013). As can be seen, at gap size of 4 mm, the shock wave is oblique and defined by relatively high pressure. As the gap size increases to 10 mm and 16 mm, the shock wave is characterized by reduce pressure and stability. The decreased stability may be detrimental to the efficiency of the RDE and/or serve as an impediment to increasing a volume of oxidizer and/or fuel that passes through the RDE.

Further, performance of an RDE may be more dependent on the mixture of oxidizer and fuel when compared to other engines. Generally, for an RDE to sustain the shockwave, the mixture of the fuel and oxidizer should remain in the detonable limits (e.g., where the energy released from combustion is sufficient to sustain a detonation wave) of the mixture instead of the flammability limits. Attention is directed to FIG. 2, which shows a comparison of the detonable limits to the flammability limits for an example fuel (hydrogen) and oxidizer (air). See, *State-Of-The-Art Report on Flame Acceleration And Deflagration-To-Detonation Transition In Nuclear Safety,* OECD Nuclear Energy Agency, France (August 2000). The detonable limits are typically significantly smaller than the flammability limits. This limits the amount of oxidizer that is capable of flowing through the RDE.

SUMMARY

A rotating detonation engine comprising an annular main chamber configured to sustain a main shockwave that moves along a perimeter of the main chamber and an annular pilot chamber configured to sustain a pilot shockwave that moves along a perimeter of the pilot chamber, the main shockwave being generated in response to the pilot shockwave extending into the main chamber.

A rotating detonation engine system comprising: a rotating detonation engine comprising an annular main chamber configured to sustain a main shockwave that moves along a perimeter of the main chamber, an annular pilot chamber configured to sustain a pilot shockwave that moves along a perimeter of the pilot chamber, the main shockwave being generated in response to the pilot shockwave extending into the main chamber, and a control system configured to control operation of the rotating detonation engine.

BRIEF DESCRIPTION OF THE DRAWINGS

These and other features and advantages will be better understood by reading the following detailed description, taken together with the drawings, wherein:

FIG. 7 is a schematic diagram of an RDE system, consistent with the present disclosure.

FIG. 8 is a schematic diagram of an oxidizer delivery system capable of being used with the RDE system of FIG. 7, consistent with the present disclosure.

FIG. 9 is a schematic diagram of a fuel delivery system capable of being used with the RDE system of FIG. 7, consistent with the present disclosure.

DETAILED DESCRIPTION OF PREFERRED EMBODIMENTS

The present disclosure is generally directed to a rotating detonation engine ("RDE"). The rotating detonation engine includes an annular pilot chamber having a pilot gap width and an annular main chamber having a main gap width, the main gap width preferably measuring greater than the pilot gap width. The gap width corresponds to a separation distance extending between opposing sidewalls defining the corresponding chambers. The annular pilot chamber is configured to sustain a pilot shockwave that extends into the annular main chamber, causing a main shockwave to be generated within the main annular chamber.

The pilot annular chamber can be preferably configured to have conditions (e.g., chamber geometry and/or fuel/oxidizer mixture) that are optimized (e.g., near ideal) for generating and sustaining the pilot shockwave. As such, the stability of the main shockwave may be improved when generated using the pilot shockwave. The generation of the main shockwave using the pilot shockwave may allow the main gap width to be increased without detrimentally impacting the generated main shockwave (e.g., the increase in stability of the main shockwave, as a result of the use of the pilot shockwave, may be greater than the decrease in stability as a result of the increased main gap width). The increased main gap width may allow additional fuel and/or oxidizer to be delivered to the main annular chamber.

Further, the pilot shockwave may possess sufficient energy to extend the detonable limit of a fuel oxidizer mixture being used, allowing mixtures that, in the absence of the pilot shockwave, would be too rich or too lean to generate and/or sustain the main shockwave. In other words, the annular pilot chamber and the pilot shockwave generated therein may increase the operating range of the RDE when compared to an RDE having only a single chamber.

Figure 1:
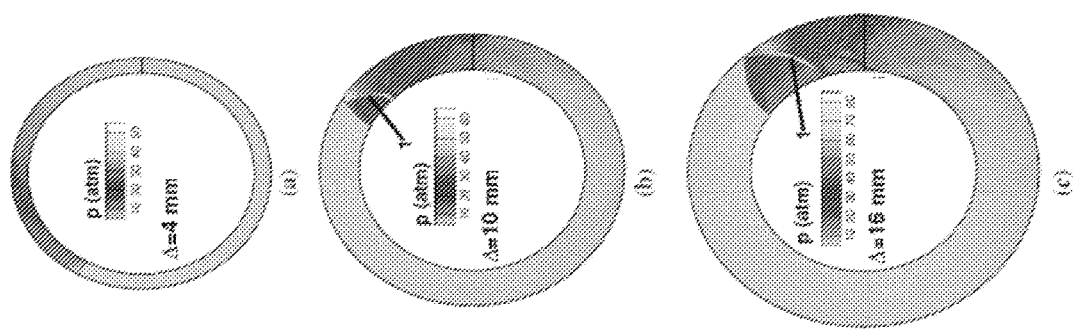
FIG. 1 shows a schematic example of the impact of increasing a size of an annular channel (e.g., a gap size) on the stability of a shockwave within a rotating detonation engine ("RDE"), consistent with the present disclosure.
Figure 2:
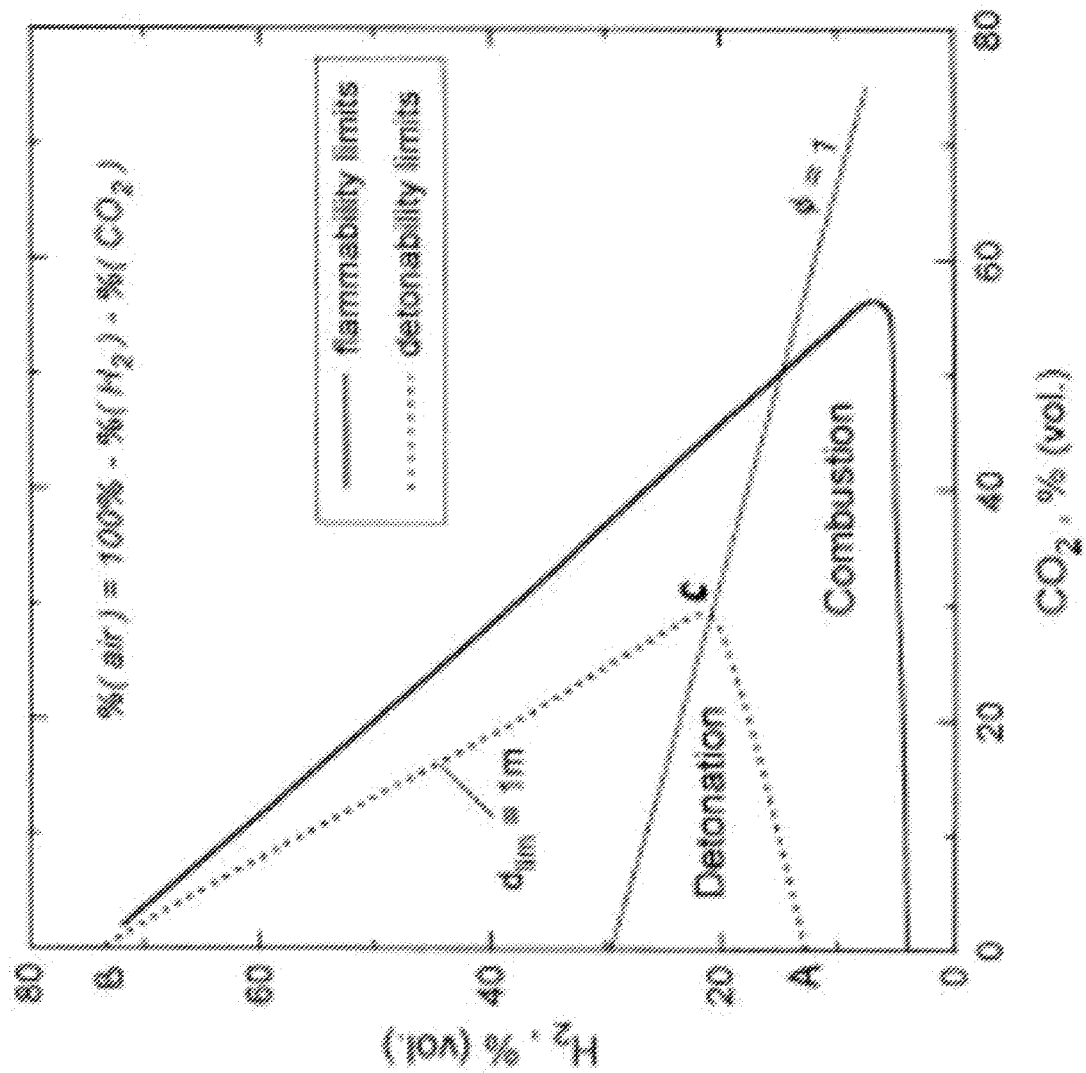
FIG. 2 is a graphical representation of the detonable limits and flammability limits for a given mixture of fuel and oxidizer, consistent with the present disclosure.
Figure 3:
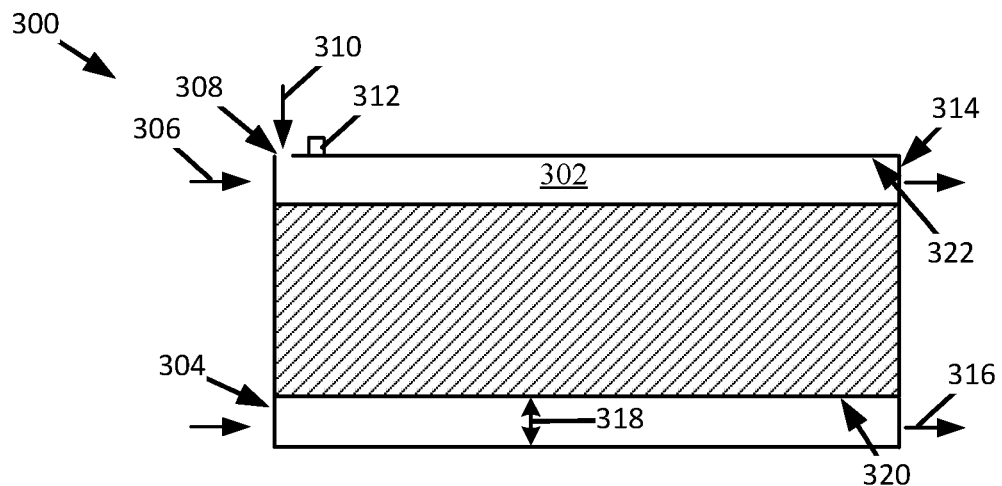
FIG. 3 is a schematic cross-sectional view of an example of a RDE, consistent with the present disclosure.
Figure 4:
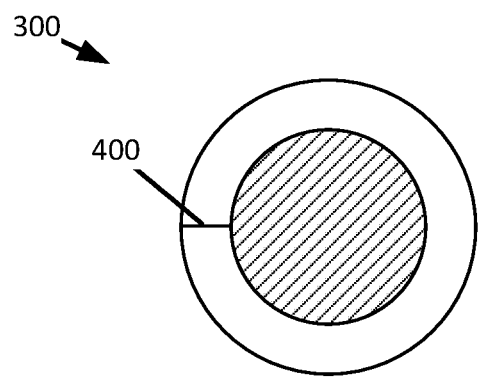
FIG. 4 is a schematic end view of the RDE of FIG. 3, consistent with the present disclosure.

FIG. 3 shows a schematic cross-sectional view of an RDE 300 having a single chamber 302 and FIG. 4 shows a schematic end view of the RDE 300 having a shockwave 400. In operation, the shockwave 400 travels (or moves) along a sidewall of the chamber 302. In other words, the shockwave 400 moves along a perimeter of the chamber 302. As shown, the RDE 300 includes at least one oxidizer inlet 304 configured to receive an oxidizer 306, at least one fuel inlet 308 through which fuel 310 passes to mix with the oxidizer 306, an igniter 312 to ignite the fuel 310, and an outlet 314 through which exhaust 316 passes. The chamber 302 has an annular shape that extends between the oxidizer inlet 304 and the outlet 314. The chamber 302 has a gap width 318 that extends between opposing surfaces 320 and 322 of the chamber 302. As the gap width 318 increases the stability of the shockwave 400 decreases (see, e.g., FIG. 1) while the volume of the oxidizer 306 and/or the fuel 310 capable of entering the chamber 302 increases.

Figure 5:
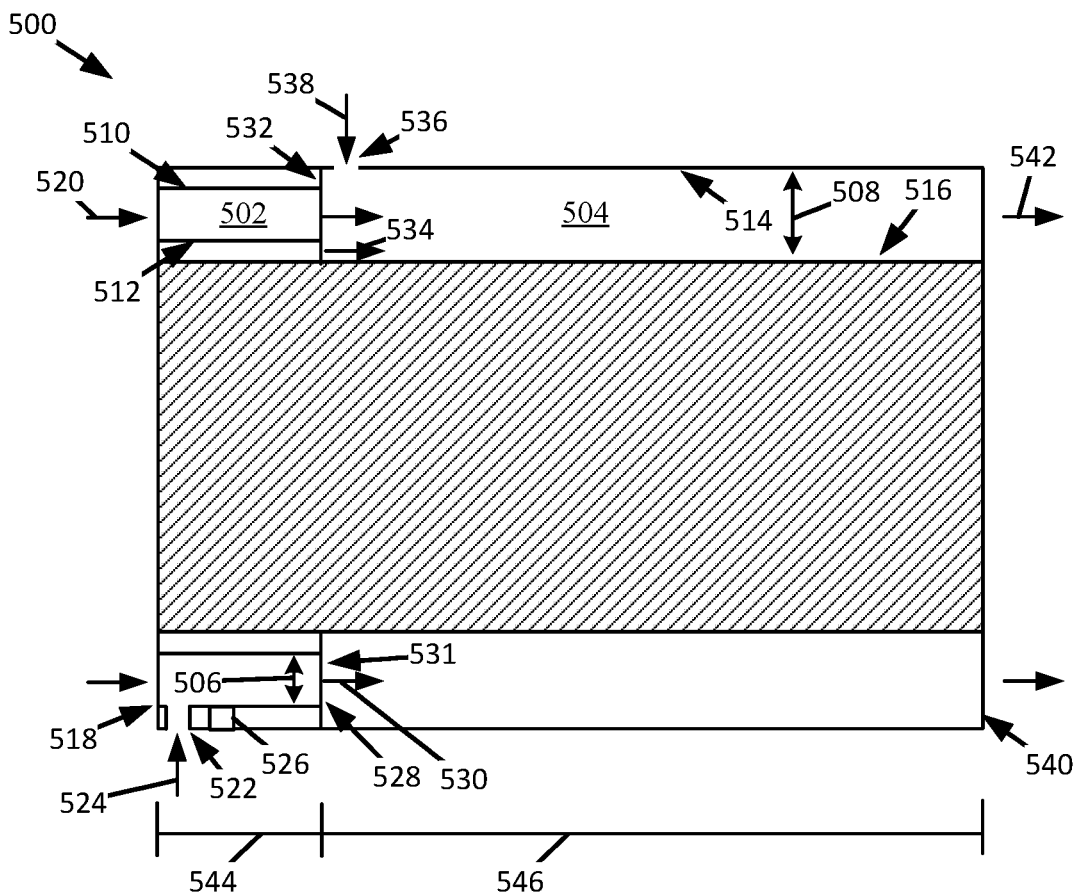
FIG. 5 is a schematic cross-sectional view of an RDE having a pilot chamber and a main chamber, consistent with the present disclosure.
Figure 6:
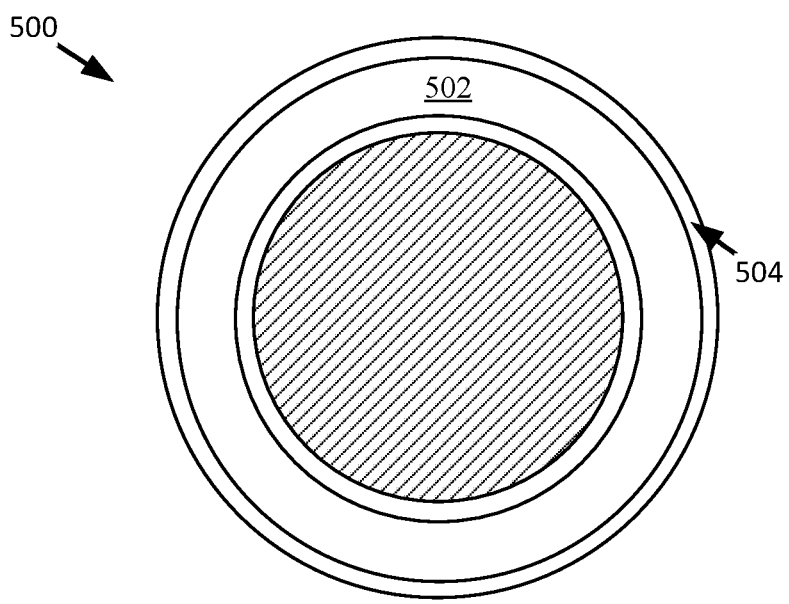
FIG. 6 is a schematic end view of the RDE of the FIG. 5, consistent with the present disclosure.

FIG. 5 shows a schematic cross-sectional view of an RDE 500 having a pilot chamber 502 and a main chamber 504 and FIG. 6 shows an end view of the RDE 500. The pilot chamber 502 is fluidly coupled to the main chamber 504 such that a pilot shockwave generated in the pilot chamber 502 can extend from the pilot chamber 502 and into the main chamber 504. Once in the main chamber 504, the pilot shockwave can cause a main shockwave to be generated within the main chamber 504. In other words, the main shockwave is generated in response to the pilot shockwave extending into the main chamber 504.

The pilot chamber 502 is configured to sustain the pilot shockwave such that the pilot shockwave moves along a perimeter of the pilot chamber 502 and the main chamber 504 is configured to sustain the main shockwave such that the main shockwave moves along a perimeter of the main chamber 504. As shown, the pilot chamber 502 and the main chamber 504 have an annular shape. The pilot chamber 502 has a pilot chamber gap width 506 and the main chamber 504 has a main chamber gap width 508. The pilot chamber gap width 506 may measure less than the main chamber gap width 508. The pilot chamber gap width 506 extends between opposing pilot sidewalls 510 and 512 of the pilot chamber 502 and the main chamber gap width 508 extends between opposing main sidewalls 514 and 516 of the main chamber 504. The pilot chamber gap width 506 is contemplated to measure, for example, in a preferred range of 10 to 40 percent of the main chamber gap width 508.

The pilot chamber 502 includes at least one pilot oxidizer inlet 518 configured to receive a pilot oxidizer 520, at least one pilot fuel inlet 522 through which pilot fuel 524 passes and mixes with the pilot oxidizer 520 within the pilot chamber 502, an ignitor 526 configured to be actuated to ignite the pilot fuel 524 within the pilot chamber 502, generating a pilot shockwave, and a pilot outlet 528 through which a pilot exhaust 530 passes. The pilot exhaust 530 includes the pilot shockwave and passes from the pilot outlet 528 and into the main chamber 504 through a shockwave inlet 531 of the main chamber 504. The pilot fuel inlet 522 may be defined in a perimeter of the pilot chamber 502.

The main chamber 504 includes at least one main chamber oxidizer inlet 532 configured to receive a main oxidizer 534, at least one main fuel inlet 536 through which main fuel 538 passes and mixes with the main oxidizer 534 within the main chamber 504, and a main outlet 540 through which a main exhaust 542 passes. The main exhaust 542 may include the main shockwave. The main fuel inlet 536 may be defined in a perimeter of the main chamber 504. The main fuel 538 is ignited using the pilot exhaust 530 (e.g., the pilot shockwave) to form the main shockwave within the main chamber 504. Ignition using the pilot exhaust 530 improves the stability of the main shockwave generated within the main chamber 504. Additionally, or alternatively, use of the pilot exhaust 530 to ignite the main shockwave may extend the detonable limits of the mixture of the main fuel 538 and the main oxidizer 534, which may allow for a leaner or richer mixture to be used (when compared to an RDE that does not include the pilot chamber 502 such as the RDE 300 of FIG. 3).

The pilot oxidizer 520 and the main oxidizer 534 may be the same or different oxidizer, for example, the oxidizers 520 and 534 may preferably be pure oxygen and air. The pilot oxidizer 520 and the main oxidizer 534 may be delivered to the pilot chamber 502 and the main chamber 504, respectively, at the same or different flow rates. In other words, the flow rate for the pilot oxidizer 520 and the main oxidizer 534 may be independently controlled.

The pilot fuel 524 and the main fuel 538 may be the same or different fuel, for example, the fuels 524 and 538 may preferably be hydrogen and a hydrocarbon fuel. The pilot fuel 524 and the main fuel 538 may be delivered to the pilot chamber 502 and the main chamber 504, respectively, at that same or at different flow rates. In other words, the flow rates of the pilot fuel 524 and the main fuel 538 may be independently controlled. Independent control of the flow rates may allow the exit temperature of the main exhaust 542 to be controlled. For example, the flow rates may be adjusted such that the exit temperature of the main exhaust 542 generally corresponds to an inlet temperature for a turbine. Such a configuration may reduce a quantity of cooling air that is mixed with the main exhaust 542. The flow rate of the pilot fuel 524 may measure, for example, in a preferred range of 5 to 30 percent of the total fuel flow rate.

The pilot fuel 524 and the main fuel 538 can be delivered to the pilot chamber 502 and the main chamber 504, respectively, via a plurality of pilot fuel inlets 522 and a plurality of main fuel inlets 536, wherein the fuel inlets 522 and 536 extend circumferentially around a respective one of the pilot chamber 502 and the main chamber 504. In this instance, each pilot fuel inlet 522 and each main fuel inlet 536 may deliver fuel 524 and 538 at different flow rates. Varying flow rates between pilot fuel inlets 522 and/or between main fuel inlets 536 may allow emissions, performance, and/or an operating range of the RDE 500 to be adjusted. A difference in flow rate between two immediately adjacent pilot fuel inlets 522 may measure, for example, in a preferred range of 0 to 100% and a difference in flow rate between two immediately adjacent main fuel inlets 536 may measure, for example, in a preferred range of 0 to 100%.

The pilot chamber 502 may have a pilot chamber length 544 and the main chamber 504 may have a main chamber length 546. The pilot chamber length 544 is measured between the pilot chamber oxidizer inlet 518 and the pilot outlet 528 and the main chamber length 546 is measured between main chamber oxidizer inlet 532 and the main outlet 540. The pilot chamber length 544 may measure, for example, in a preferred range of 5 to 25% of the main chamber length.

FIG. 7 shows a schematic diagram of an RDE system 700. As shown, the RDE system 700 includes a control system 702 configured to control operation of an RDE 704, which may be an example of the RDE 500 of FIG. 5. As shown, the RDE 704 includes a pilot chamber 706 and a main chamber 708. Operation of the pilot chamber 706 and the main chamber 708 may be independently controlled by the control system 702. The RDE system 700 further includes a pilot oxidizer delivery system 710, a pilot fuel delivery system 712, a main oxidizer delivery system 714, and a main fuel delivery system 716, each communicatively coupled to the control system 702.

The pilot oxidizer delivery system 710 is configured to cause an oxidizer to be delivered to the pilot chamber 706. For example, the pilot oxidizer delivery system 710 may control a flow rate of oxidizer delivered to the pilot chamber 706. The flow rate of the oxidizer may be adjustable using the pilot oxidizer delivery system 710 during operation of the RDE 704. In some instances, a flow rate of an oxidizer can be controlled by the control system 702. For example, the control system 702 may be configured to receive data gathered by one or more sensors configured to monitor the RDE 704 (e.g., data indicative of one or more performance metrics) and based, at least in part, on the data cause the pilot oxidizer delivery system 710 to adjust the flow rate of the oxidizer.

By way of further example, in some instances, there may be a plurality of pilot oxidizer inlets through which oxidizer is introduced into the pilot chamber 706. In these instances, the pilot oxidizer delivery system 710 may control which pilot oxidizer inlet(s) the oxidizer is delivered through. For example, the control system 702 may be configured to receive data gathered by one or more sensors configured to monitor the RDE 704 (e.g., data indicative of one or more performance metrics) and based, at least in part, on the data cause the pilot oxidizer delivery system 710 to adjust which pilot oxidizer inlet(s) receive oxidizer.

The pilot fuel delivery system 712 is configured to cause a fuel to be delivered to the pilot chamber 706. For example, the pilot fuel delivery system 712 may control a flow rate of fuel delivered to the pilot chamber 706. The flow rate of the fuel may be adjustable using the pilot fuel delivery system 712 during operation of the RDE 704. In some instances, a flow rate of a fuel can be controlled by the control system 702. For example, the control system 702 may be configured to receive data gathered by one or more sensors configured to monitor the RDE 704 (e.g., data indicative of one or more performance metrics) and based, at least in part, on the data cause the pilot fuel delivery system 712 to adjust the flow rate of the fuel.

By way of further example, in some instances, there may be a plurality of pilot fuel inlets through which fuel is introduced into the pilot chamber 706. In these instances, the pilot fuel delivery system 712 may control which pilot fuel inlet(s) the fuel is delivered through. For example, the control system 702 may be configured to receive data gathered by one or more sensors configured to monitor the RDE 704 (e.g., data indicative of one or more performance metrics) and based, at least in part, on the data cause the pilot fuel delivery system 712 to adjust which pilot fuel inlet(s) receive fuel.

The main oxidizer delivery system 714 is configured to cause an oxidizer to be delivered to the main chamber 708. For example, the main oxidizer delivery system 714 may control a flow rate of oxidizer delivered to the pilot chamber 706. The flow rate of the oxidizer may be adjustable using the main oxidizer delivery system 714 during operation of the RDE 704. In some instances, a flow rate of an oxidizer may be controlled by the control system 702. For example, the control system 702 may be configured to receive data gathered by one or more sensors configured to monitor the RDE 704 (e.g., data indicative of one or more performance metrics) and based, at least in part, on the data cause the main oxidizer delivery system 714 to adjust the flow rate of the oxidizer.

By way of further example, in some instances, there may be a plurality of main oxidizer inlets through which oxidizer is introduced into the main chamber 708. In these instances, the main oxidizer delivery system 714 may control which main oxidizer inlet(s) the oxidizer is delivered through. For example, the control system 702 may be configured to receive data gathered by one or more sensors configured to monitor the RDE 704 (e.g., data indicative of one or more performance metrics) and based, at least in part, on the data cause the main oxidizer delivery system 714 to adjust which main oxidizer inlet(s) receive oxidizer.

The main fuel delivery system 716 is configured to cause a fuel to be delivered to the main chamber 708. For example, the main fuel delivery system 716 may control a flow rate of fuel delivered to the main chamber 708. The flow rate of the fuel may be adjustable using the main fuel delivery system 716 during operation of the RDE 704. In some instances, a flow rate of a fuel can be controlled by the control system 702. For example, the control system 702 may be configured to receive data gathered by one or more sensors configured to monitor the RDE 704 (e.g., data indicative of one or more performance metrics) and based, at least in part, on the data cause the main fuel delivery system 716 to adjust the flow rate of the fuel.

By way of further example, in some instances, there may be a plurality of main fuel inlets through which fuel is introduced into the main chamber 708. In these instances, the main fuel delivery system 716 may control which pilot fuel inlet(s) the fuel is delivered through. For example, the control system 702 may be configured to receive data gathered by one or more sensors configured to monitor the RDE 704 (e.g., data indicative of one or more performance metrics) and based, at least in part, on the data cause the main fuel delivery system 716 to adjust which main fuel inlet(s) receive fuel.

FIG. 8 shows a schematic diagram of an example of an oxidizer delivery system 800. The oxidizer delivery system 800 may be an example of one or more of the pilot oxidizer delivery system 710 and/or the main oxidizer delivery system 714. The oxidizer delivery system 800 may include one or more oxidizer flow control valves 802 and an oxidizer pump 804. In some instances, and as shown, the oxidizer delivery system 800 may include at least one oxidizer storage tank 806. The one or more oxidizer flow control valves 802 can be configured to receive one or more control signals from a control system (e.g., the control system 702 of FIG. 7). In response to receiving the control signals, the one or more oxidizer flow control valves 802 can be caused to transition towards an open or closed position in order to control a flow rate of oxidizer passing therethrough. In instances having a plurality of oxidizer flow control valves 802, each oxidizer flow control valve 802 may be independently controlled.

The oxidizer pump 804 is configured to urge oxidizer through the one or more oxidizer flow control valves 802, when at least one of the one or more oxidizer flow control valves 802 is at least partially open. In some instances, the oxidizer pump 804 can receive one or more control signals from a control system (e.g., the control system 702 of FIG. 7). In response to receiving the control signals, the oxidizer pump 804 can adjust a flow rate of oxidizer passing through the oxidizer pump 804.

The oxidizer storage tank 806 is configured to store oxidizer. In some instances, the oxidizer storage tank 806 may include a plurality of oxidizer storage chambers. Each oxidizer storage chamber may be configured to receive a corresponding oxidizer. The oxidizers in each oxidizer storage chamber may be different. The one or more oxidizer flow control valves 802 and/or the oxidizer pump 804 can be configured such that oxidizer stored within each storage chamber may be selectively released therefrom.

FIG. 9 shows a schematic diagram of an example of a fuel delivery system 900. The fuel delivery system 900 may be an example of one or more of the pilot fuel delivery system 712 and/or the main fuel delivery system 716. The fuel delivery system 900 may include one or more fuel flow control valves 902 and a fuel pump 904. In some instances, and as shown, the fuel delivery system 900 may include at least one fuel storage tank 906. The one or more fuel flow control valves 902 can be configured to receive one or more control signals from a control system (e.g., the control system 702 of FIG. 7). In response to receiving the control signals, the one or more fuel flow control valves 902 can be caused to transition towards an open or closed position in order to control a flow rate of fuel passing therethrough. In instances having a plurality of fuel flow control valves 902, each fuel flow control valve 902 may be independently controlled.

The fuel pump 904 is configured to urge fuel through the one or more fuel flow control valves 902, when at least one of the one or more fuel flow control valves 902 is at least partially open. In some instances, the fuel pump 904 can receive one or more control signals from a control system (e.g., the control system 702 of FIG. 7). In response to receiving the control signals, the fuel pump 904 can adjust a flow rate of fuel passing through the fuel pump 904.

The fuel storage tank 906 is configured to store fuel. In some instances, the fuel storage tank 906 may include a plurality of fuel storage chambers. Each fuel storage chamber may be configured to receive a corresponding fuel. The fuels in each fuel storage chamber may be different. The one or more fuel flow control valves 902 and/or the fuel pump 904 can be configured such that fuel stored within each storage chamber may be selectively released therefrom.

Figure 10:
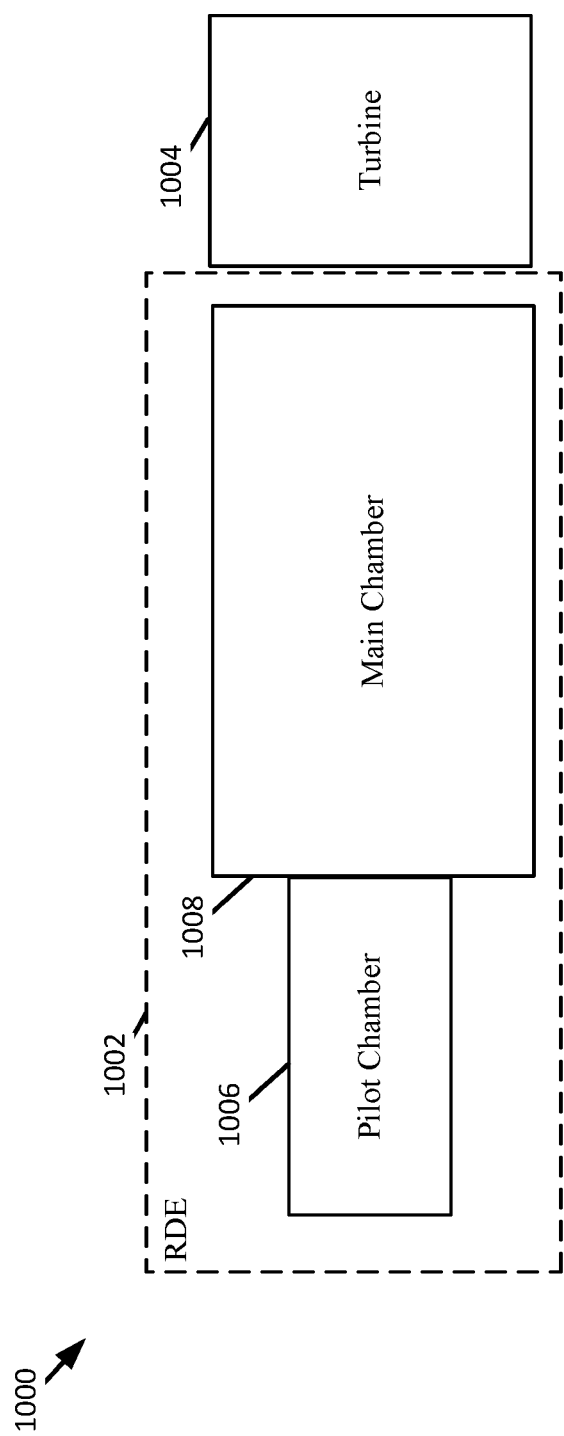
FIG. 10 is a schematic diagram of an energy system having an RDE, consistent with the present disclosure.

FIG. 10 a schematic diagram of an energy system 1000 that includes an RDE 1002 and a turbine 1004, wherein the RDE 1002 may be an example of the RDE 500 of FIG. 5. The RDE 1002 includes a pilot chamber 1006 and a main chamber 1008. As shown, a shockwave exhausted from the main chamber 1008 can be directed into the turbine 1004, causing a corresponding rotation of one or more blades of the turbine 1004.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A rotating detonation engine comprising:
an annular main chamber configured to sustain a main shockwave that moves along a perimeter of the annular main chamber; and
an annular pilot chamber configured to sustain a pilot shockwave that moves along a perimeter of the annular pilot chamber, the main shockwave being generated in response to the pilot shockwave extending into the main chamber;
wherein said annular main chamber includes a plurality of annular main chamber fuel inlets that extend circumferentially around said annular main chamber;
said annular pilot chamber includes a plurality of annular pilot chamber fuel inlets that extend circumferentially around said annular pilot chamber; and wherein said pilot shockwave and said main shockwave extend along a centerline axis wherein said pilot chamber is coaxial with said main chamber about the centerline axis of the main chamber such that the pilot chamber exhausts products from an outlet into the main chamber parallel to the centerline axis.

2. The rotating detonation engine of claim 1, wherein the pilot chamber has a pilot chamber gap width and the main chamber has a main chamber gap width, the pilot chamber gap width measures less than the main chamber gap width.

3. The rotating detonation engine of claim 2, wherein the pilot chamber gap width extends between opposing sidewalls of the pilot chamber and the main chamber gap width extends between opposing sidewalls of the main chamber.

4. The rotating detonation engine of claim 2, wherein the pilot chamber gap width measures in a range of 10 to 40 percent of the main chamber gap width.

5. The rotating detonation engine of claim 1, wherein the main chamber includes at least one main fuel inlet and the pilot chamber includes at least one pilot fuel inlet.

6. The rotating detonation engine of claim 5, wherein the at least one main fuel inlet is defined in the perimeter of the main chamber and the at least one pilot fuel inlet is defined in the perimeter of the pilot chamber.

7. The rotating detonation engine of claim 1, wherein the pilot chamber includes an ignitor to ignite fuel within the pilot chamber, generating the pilot shockwave.

8. The rotating detonation engine system of claim 1 wherein each of said plurality of annular main chamber fuel inlets delivers fuel at different flow rates.

9. The rotation detonation engine system of claim 1 wherein each of said plurality of annular pilot chamber fuel inlets delivers fuel at different flow rates.

10. A rotating detonation engine system comprising:
a rotating detonation engine comprising:
an annular main chamber configured to sustain a main shockwave that moves along a perimeter of the annular main chamber; and
an annular pilot chamber configured to sustain a pilot shockwave that moves along a perimeter of the annular pilot chamber, the main shockwave being generated in response to the pilot shockwave extending into the main chamber; and
a control system configured to control operation of the rotating detonation engine;
wherein said annular main chamber includes a plurality of annular main chamber fuel inlets that extend circumferentially around said annular main chamber;
said annular pilot chamber includes a plurality of annular pilot chamber fuel inlets that extend circumferentially around said annular pilot chamber; and wherein said pilot shockwave and said main shockwave extend along a centerline axis wherein said pilot chamber is coaxial with said main chamber about the centerline axis of the main chamber such that the pilot chamber exhausts products from an outlet into the main chamber parallel to the centerline axis.

11. The rotating detonation engine system of claim 10, wherein the pilot chamber has a pilot chamber gap width and the main chamber has a main chamber gap width, the pilot chamber gap width measures less than the main chamber gap width.

12. The rotating detonation engine system of claim 11, wherein the pilot chamber gap width extends between opposing sidewalls of the pilot chamber and the main chamber gap width extends between opposing sidewalls of the main chamber.

13. The rotating detonation engine system of claim 11, wherein the pilot chamber gap width measures in a range of 10 to 40 percent of the main chamber gap width.

14. The rotating detonation engine system of claim 10, wherein the main chamber includes at least one main fuel inlet and the pilot chamber includes at least one pilot fuel inlet.

15. The rotating detonation engine system of claim 14, wherein the at least one main fuel inlet is defined in the perimeter of the main chamber and the at least one pilot fuel inlet is defined in the perimeter of the pilot chamber.

16. The rotating detonation engine system of claim 10, wherein the pilot chamber includes an ignitor to ignite fuel within the pilot chamber, generating the pilot shockwave.

17. The rotating detonation engine system of claim 10 further comprising a pilot fuel delivery system communicatively coupled to the control system and a main fuel delivery system communicatively coupled to the control system.

18. The rotating detonation engine system of claim 17, wherein the pilot fuel delivery system is configured to deliver a first fuel at a first fuel flow rate to the pilot chamber and the main fuel delivery system is configured to deliver a second fuel at a second fuel flow rate to the main chamber, the control system controlling the first and second flow rates.

19. The rotating detonation engine system of claim 18, wherein the first flow rate is different from the second flow rate.

20. The rotating detonation engine system of claim 18, wherein the first fuel is different from the second fuel.

21. The rotating detonation engine system of claim 10 further comprising a pilot oxidizer delivery system communicatively coupled to the control system and a main oxidizer delivery system communicatively coupled to the control system.

22. The rotating detonation engine system of claim 21, wherein the pilot oxidizer delivery system is configured to deliver a first oxidizer to the pilot chamber at a first oxidizer flow rate and the main oxidizer delivery system is configured to deliver a second oxidizer to the main chamber at a second oxidizer flow rate, the control system controlling the first and second oxidizer flow rates.

23. The rotating detonation engine system of claim 10 wherein each of said plurality of annular main chamber fuel inlets delivers fuel at different flow rates.

24. The rotation detonation engine system of claim 10 wherein each of said plurality of annular pilot chamber fuel inlets delivers fuel at different flow rates.

* * * * *